United States Patent [19]

Faulk

[11] Patent Number: 5,657,215
[45] Date of Patent: Aug. 12, 1997

[54] CONTROLLING SWITCH-MODE POWER CONVERSION

[75] Inventor: Richard A. Faulk, Cypress, Tex.

[73] Assignee: Compaq Computer Corporation, Houston, Tex.

[21] Appl. No.: 520,756

[22] Filed: Aug. 29, 1995

[51] Int. Cl.⁶ .................................... H02M 1/12
[52] U.S. Cl. .............................. 363/41; 363/97
[58] Field of Search ........................ 363/37, 41, 95, 363/98, 97, 132; 318/801, 811; 388/811

[56] References Cited

U.S. PATENT DOCUMENTS

| | | | |
|---|---|---|---|
| 4,825,028 | 4/1989 | Smith | 363/98 |
| 4,924,168 | 5/1990 | Horie et al. | 318/811 |
| 5,375,050 | 12/1994 | Nakata et al. | 363/41 |
| 5,467,262 | 11/1995 | Nakata et al. | 363/41 |

OTHER PUBLICATIONS

K. Kit Sum, *Switch Mode Power Conversion: Basic Theory and Design*, Marrel Dekker, Inc., New York, New York 1984, pp. 1–17.

Jeffrey H. Hwang, Micro Linear Corporation, "ML482X: Green Mode Power Conservation," presented Jun. 29, 1994, at Compaq Computer Corporation facilities in Houston, Texas (15 viewgraphs).

*Primary Examiner*—Peter S. Wong
*Assistant Examiner*—Shawn Riley
*Attorney, Agent, or Firm*—Robert Groover; Betty Formby; Matthew Anderson

[57] ABSTRACT

In a switching converter that delivers power to a load, a transition between higher load and lower load modes is controlled by varying the width of switch control pulses in one operating phase and blanking individual pulses in another operating phase. Alternatively, in yet another operating phase the time interval between switch control pulses is varied and, at a given load condition, the time interval between successive pulses remains essentially constant.

13 Claims, 12 Drawing Sheets

FIG. 1

FIRST PHASE/PWM MODE

FIG. 2A

SECOND PHASE/MPM MODE

THIRD PHASE/SPM MODE

FIG. 2D

FIG. 3
CONTROL CIRCUITRY

FIRST PHASE/PWM MODE
FIG. 4

DUAL SLIDE MODULATOR
FIG. 5

MISSING PULSE GENERATOR
FIG. 6

TIMING LOGIC
FIG. 7

FIG. 8

SECOND AND THIRD PHASES
MPM AND SPM MODES

FIG. 9
SECOND PHASE/MPM MODE
f(A) > f(G) (ie, EAS≠V_REF2)

FIG. 10

FIG. 11 THIRD PHASE/SPM MODE (f⓰< 1/2fⓐ)

FIG. 12 — THIRD PHASE/SPM MODE ($f_{G} > 1/2 f_{A}$)

CONTROLLING SWITCH-MODE POWER CONVERSION

BACKGROUND

This invention relates to power converters that are controlled by a pulse width modulator. One such converter is a switch-mode power converter.

A typical switch-mode power converter takes a rectified AC signal, steps down the voltage, and delivers a regulated DC signal. A switch controls the conduction period or duty cycle of the converter. Switching, in turn, is controlled based on a signal representative of the output of the converter.

Voltage regulation of the output is typically achieved by pulse width modulating (PWM) the conduction time of the switch (i.e., the period when the switch is closed) while keeping the switching frequency fixed. Regulation has also been achieved by varying the frequency of fixed-width pulses, as well as by various combinations and variations of PWM and frequency variation.

SUMMARY

In general, in one aspect, the invention features a method of controlling, in a switching converter that delivers power to a load, a transition from a higher load mode to a lower load mode. In a first operating phase, the output power is reduced by reducing the width of switch control pulses, and in a second operating phase, individual pulses are blanked.

Implementations of the invention may include one or more of the following features. In a third operating phase, the time interval between successive unblanked pulses may be increased and the frequency at which individual pulses are blanked may be varied. Every other pulse may be blanked. The first operating phase may occur prior to the load falling below a first threshold. The second operating phase may occur after the load falls below the first threshold and while the load is above a second threshold. The third operating phase may occur after the load falls below the second threshold. The pulses may be separated by essentially equal length time intervals that are longer than the time intervals between pulses in the higher load mode.

In general, in another aspect, the invention features an apparatus that includes a pulse width modulator for regulating the output power in one operating phase, and pulse blanking circuitry for blanking individual pulses in a second operating phase. Implementations of the invention may include pulse spreading circuitry for increasing the intervals between successive unblanked pulses during a third operating phase.

Among the advantages of the invention are one or more of the following. When the load (e.g., a "green" computer) is operated in a reduced-power standby mode and during the transition from the high-load mode to the standby mode, efficiency is improved by reducing switching losses and ripple at the converter's regulated output voltage is minimized. Other advantages and features will become apparent from the following description and from the claims.

DESCRIPTION

Figure 1:
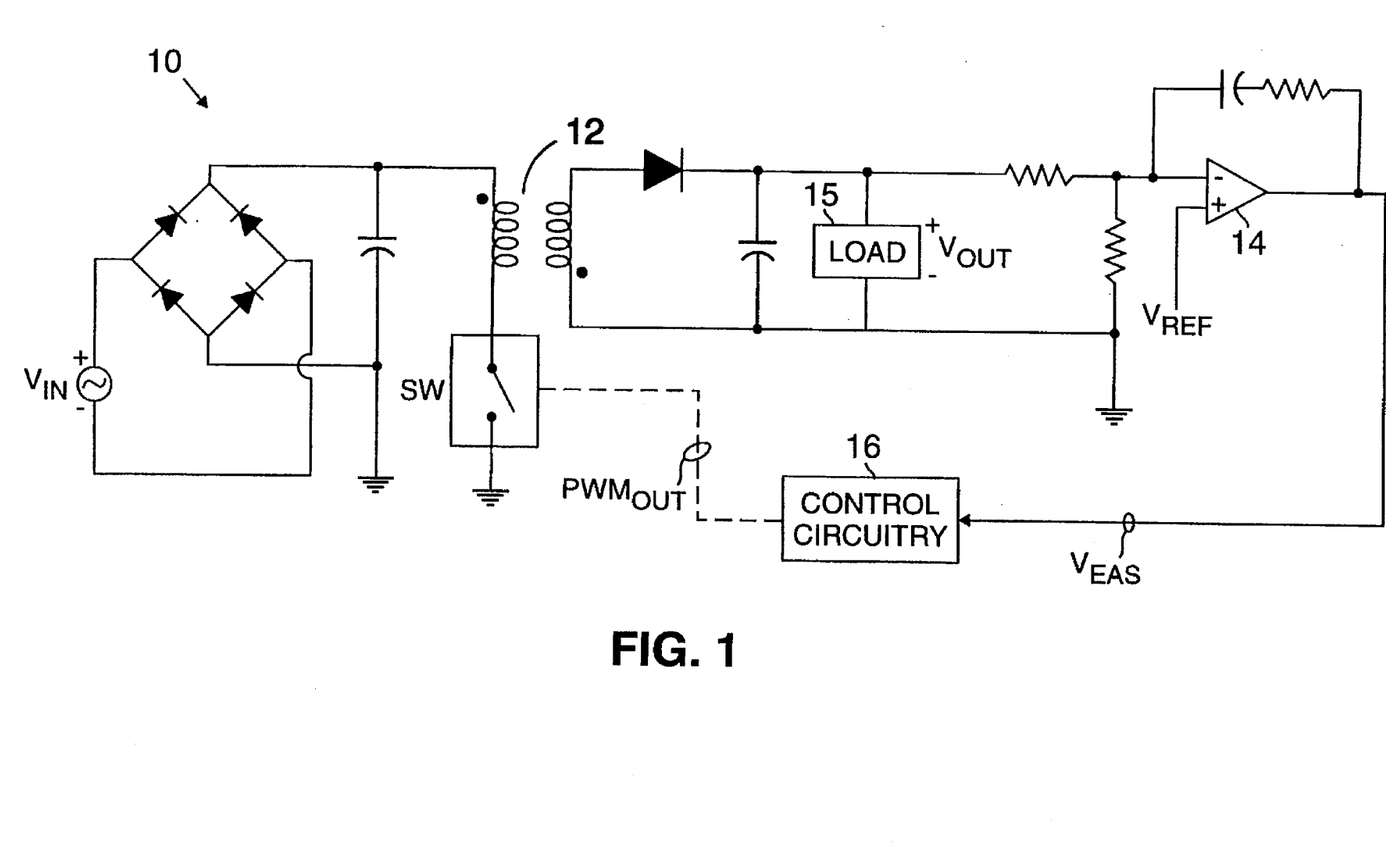
FIG. 1 is a schematic diagram of a switch-mode power converter.

A fly-back switch-mode power converter 10, shown in FIG. 1, receives an unregulated AC signal ($V_{IN}$), rectifies it, and converts it to a DC signal ($V_{OUT}$) which is regulated at a level required by an electronic device 15 to which power is being supplied.

When switch SW is closed and opened repeatedly, power is delivered to the transformer 12 and subsequently forwarded to the load. The power supplied to the load is proportional to the proportion of time that the switch is closed, $SW_{ON}/(SW_{ON}+SW_{OFF})$, and can therefore be controlled in such a way as to regulate the requisite voltage level.

Coupled to $V_{OUT}$ is an operational amplifier 14 that generates an error amplifier signal ($V_{EAS}$) which is fed back to circuitry 16 which controls switch SW. $V_{EAS}$ is proportional to the power being consumed by the load. As $V_{EAS}$ drops (when the power being consumed is decreasing), control circuitry 16 ensures that the total time that the switch SW is on ($SW_{ON}/(S_{ON}+S_{OFF})$) also drops. The control circuitry 16 generates an output signal $PWM_{OUT}$ that is either HIGH or LOW. When $PWM_{OUT}$ is HIGH ($T_{ON}$), switch SW is closed ($SW_{ON}$); when $PWM_{OUT}$ is LOW ($T_{OFF}$), switch SW is open ($SW_{OFF}$).

Figure 2A:
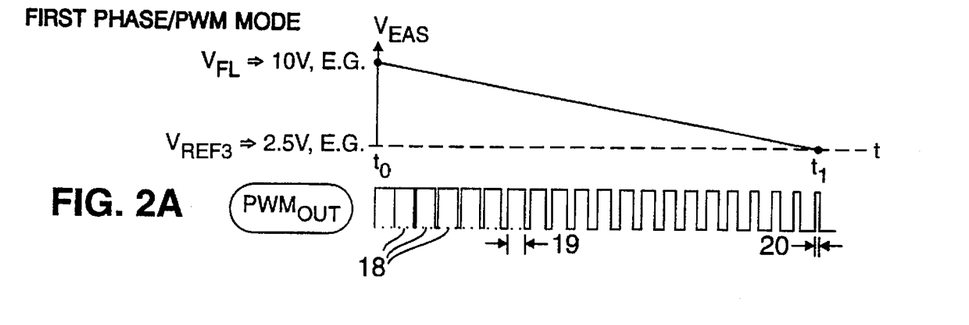
FIGS. 2A-D are timing diagrams.
Figure 2B:
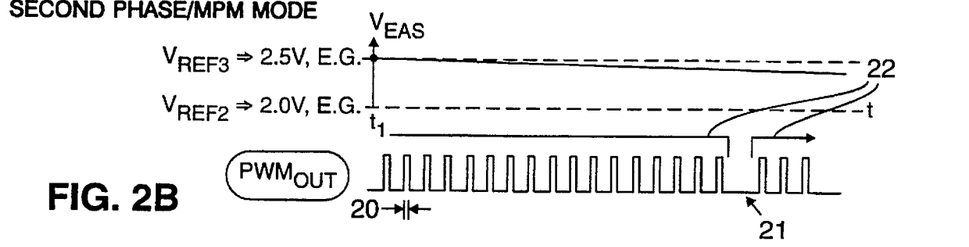

The electronic device 15 being powered may be a computer which has a "green" mode in which major power-drawing components are powered down to a standby condition. This powering down may occur in three distinct phases shown in FIGS. 2A-D. For example, while the converter is fully loaded (i.e., an 80 percent duty cycle in which $SW_{ON}/(SW_{ON}+SW_{OFF})=80\%$), $V_{EAS}$ is at 10 volts. During the transition to the green mode, the transition beginning at $t_0$, $V_{EAS}$ drops as power is reduced until dropping to reference voltage $V_{REF3}$ of, for example, 2.5 volts, at time $t_1$. In the period from $t_0$ to $t_1$, called the first phase, the converter 10 operates in a first mode, called the pulse width modulation (PWM) mode. During this first phase, $PWM_{OUT}$ is a train of pulses 18 of constant frequency. The pulse width decreases as $V_{EAS}$ decreases until a minimum pulse width 20 is reached at time $t_1$. As $V_{EAS}$ continues to drop below $V_{REF3}$ (after time $t_1$), the width of $PWM_{OUT}$ pulses remains constant and equal to the minimum pulse width 20. When $V_{EAS}$ is below $V_{REF3}$, and until $V_{EAS}$ drops to another reference voltage $V_{REF2}$ of, for example, 2.0 volts at time $t_2$, converter 10 operates in a second mode, called the missing pulse modulator (MPM) mode. The period from $t_1$ to $t_2$ is called the second phase. During this phase, single pulses of the constant-frequency, minimum-pulse-width pulse train begin to be blanked. The sequence is that a single pulse 21 is blanked followed by a number of consecutive pulses 22 being passed to $PWM_{OUT}$. When $V_{EAS}$ is slightly less than $V_{REF3}$, there may be, for example, 100 consecutive pulses passed between each blanked pulse 21. The number of consecutive passed pulses 22 decreases as $V_{EAS}$ decreases until only a single pulse 23 is passed between successive blanked pulses 21 just before $V_{EAS}$ reaches $V_{REF2}$ (time $t_2$). (Note that the time scale of the third portion of FIG. 2B is shorter than the second portion of FIG. 2C.) When $V_{EAS}$ drops below $V_{REF2}$ at $t_2$, a third phase is entered and the converter 10 operates in a third mode, called the single pulse modulator (SPM) mode. During this mode, as $V_{EAS}$ continues to decrease, the time 24 between successive pulses 23 (still of the minimum pulse width) increases until a stable green mode of operation is reached in which the time between pulses is much longer than operation in a loaded mode and remains essentially constant. $V_{EAS}$ could stop decreasing at any level and stable operation would be achieved at that point.

Figure 3:
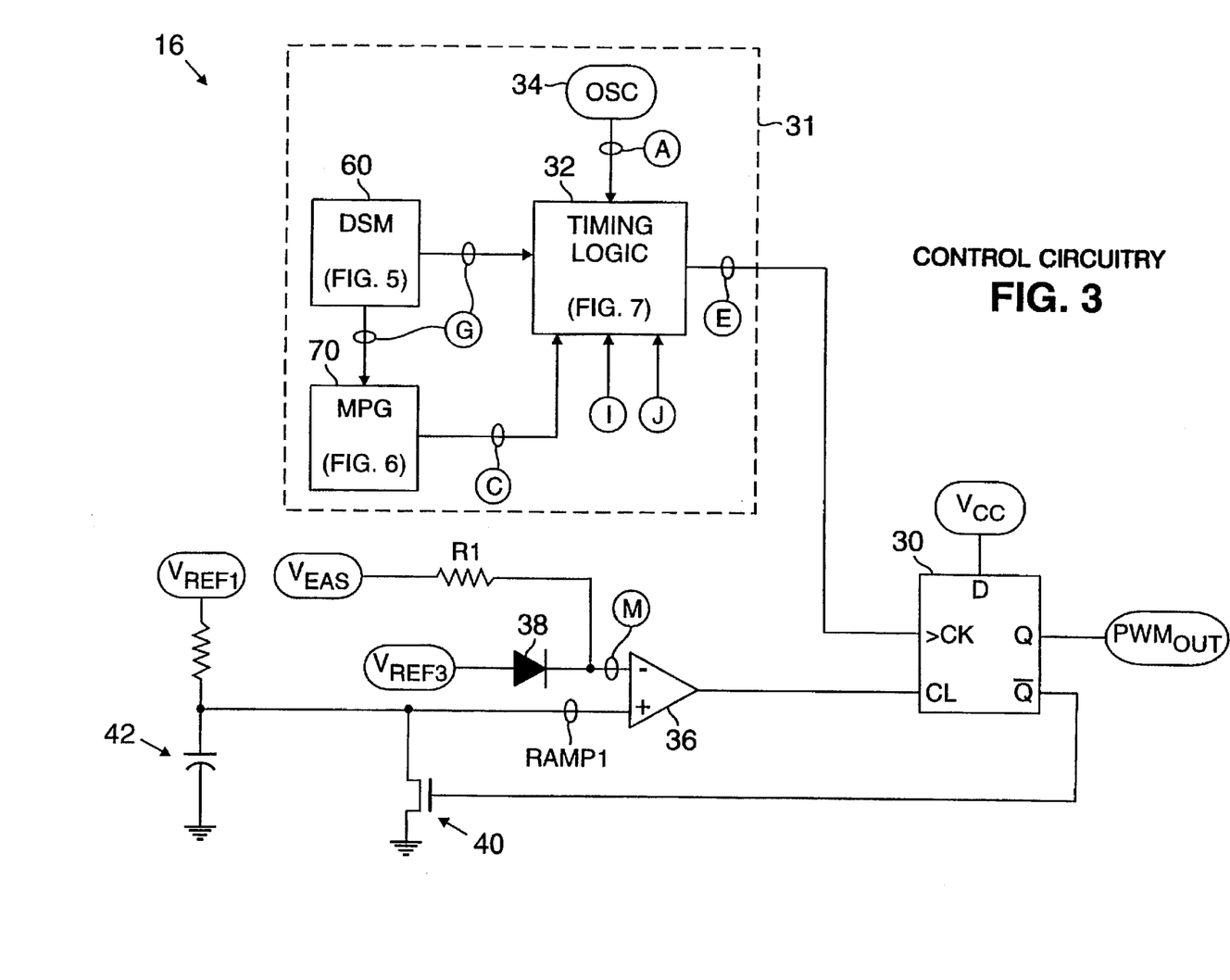
FIG. 3 is a schematic/block diagram of control circuitry.
Figure 4:
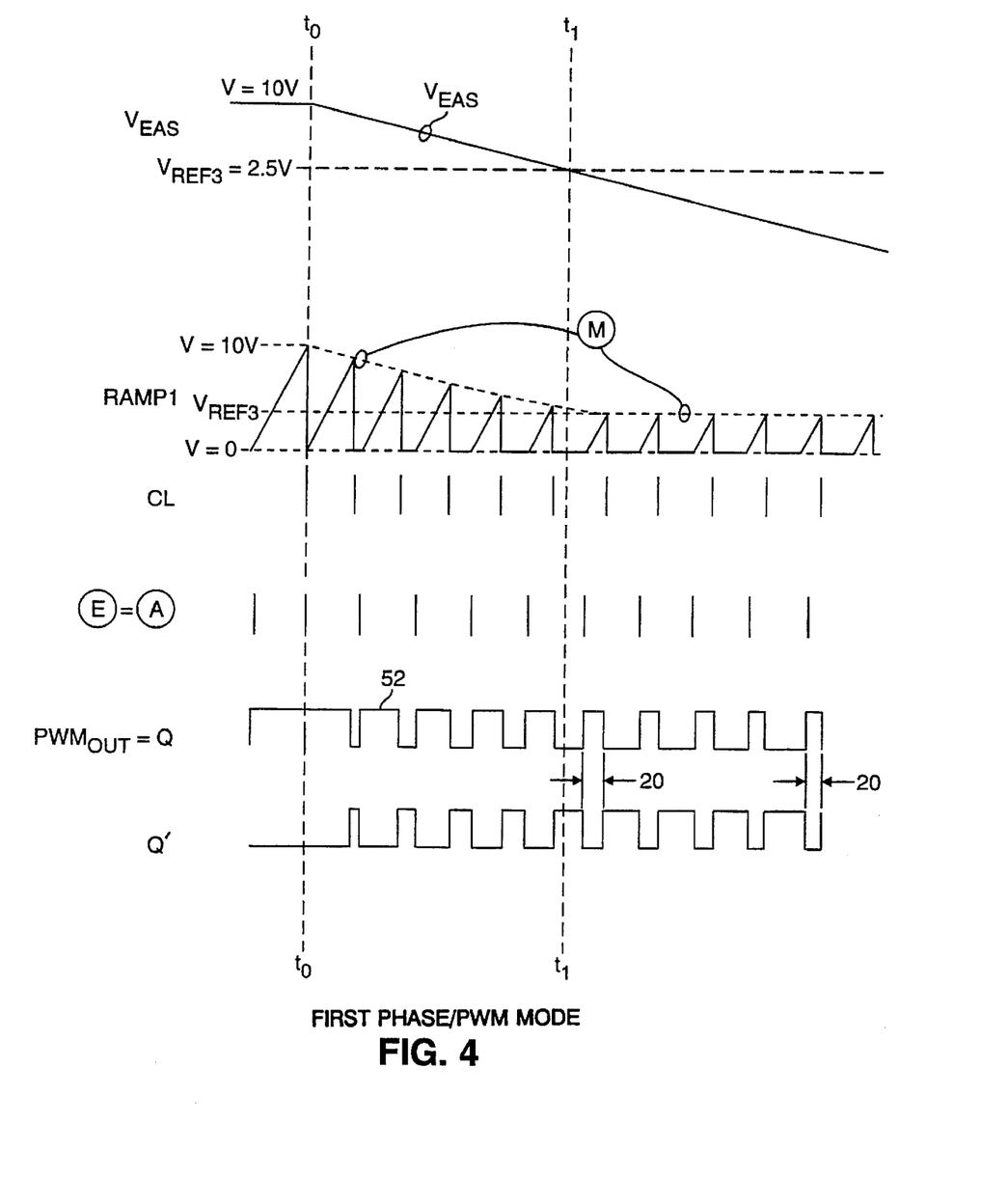
FIG. 4 is timing diagrams.

The circuitry 16 of FIG. 3 generates the $PWM_{OUT}$ described above. The D-type flip-flop 30 is triggered by the falling edge of a pulse received at its clock input CK. Because the D input of the flip-flop is always HIGH (it is connected to $V_{cc}$), the output Q goes HIGH at the falling edge of a pulse received at the CK input. The CK input is fed by clock logic 31 designed modularly as an aid in the design process. Clock logic 31 has timing logic 32 (detail shown in FIG. 7) that receives a signal A from an oscillator 34 having a frequency of, for example, 50 kHz. During the first phase, timing logic 32 provides that output E of clock logic 31 will equal signal A, the 50 kHz pulse train. Therefore, in the first phase, the D flip-flop's output Q ($PWM_{OUT}$) goes HIGH at the trailing edge of each oscillator pulse (FIG. 4).

The D flip-flop's output Q ($PWM_{OUT}$) is cleared using a ramp signal RAMP1, a comparator 36 and associated circuitry. RAMP1 is received at the positive input of comparator 36. At the negative input of the comparator, signal M is received and equals $V_{EAS}$ when $V_{EAS}$ is greater than $V_{REF3}$. This is so because when $V_{EAS}$ is greater than $V_{REF3}$, diode 38 is reverse biased, or off, thus making signal M equal to $V_{EAS}$. (Note that the diodes, such as diode 38, disclosed in this application represent switches that can be implemented by any of numerous methodologies.) When $V_{EAS}$ falls below $V_{REF3}$, however, diode 38 is forward biased and, because $V_{REF3}$ is coupled directly to comparator 36 while $V_{EAS}$ is isolated by resistor R1, signal M equals $V_{REF3}$. When RAMP1 first exceeds M, the output of comparator 36, which is the flip-flop's clear input CL, goes HIGH, causing $PWM_{OUT}$ to be latched LOW (FIG. 4). Q remains LOW until the next oscillator pulse is received at the CK input. When Q is LOW, the HIGH Q' energizes field effect transistor 40, thus holding RAMP1 at a predetermined low voltage level, for example, zero volts. At each oscillator pulse when Q goes HIGH and Q' LOW, field effect transistor 40 becomes no longer energized and the capacitor 42 is allowed to charge thus creating the ramp portion of RAMP1 (FIG. 4). During this charging time, $PWM_{OUT}$ is HIGH. As $V_{EAS}$ falls toward $V_{REF2}$, the time necessary for RAMP1 to charge from the predetermined low voltage level to the level of $V_{EAS}$ decreases. Thus, the pulse width of $PWM_{OUT}$ decreases. Once $V_{EAS}$ reaches $V_{REF2}$ (causing M to be held at $V_{REF2}$) the time required for RAMP1 to charge from the predetermined low voltage level to the level of M remains constant and the width of $PWM_{OUT}$ pulses remains constant at the minimum pulse width 20.

Figure 5:
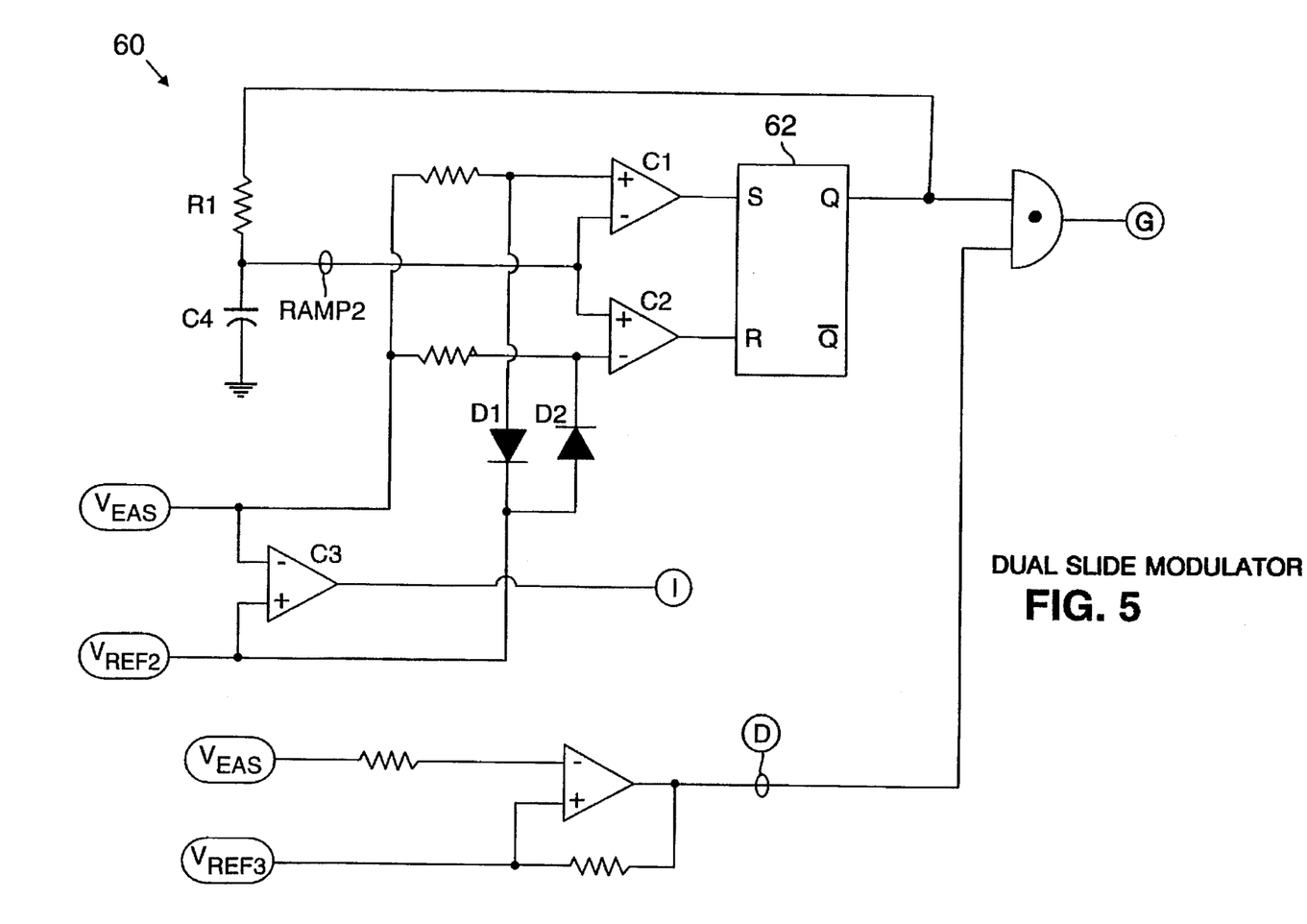
FIG. 5 is a schematic diagram of dual slide modulator circuitry.
Figure 6:
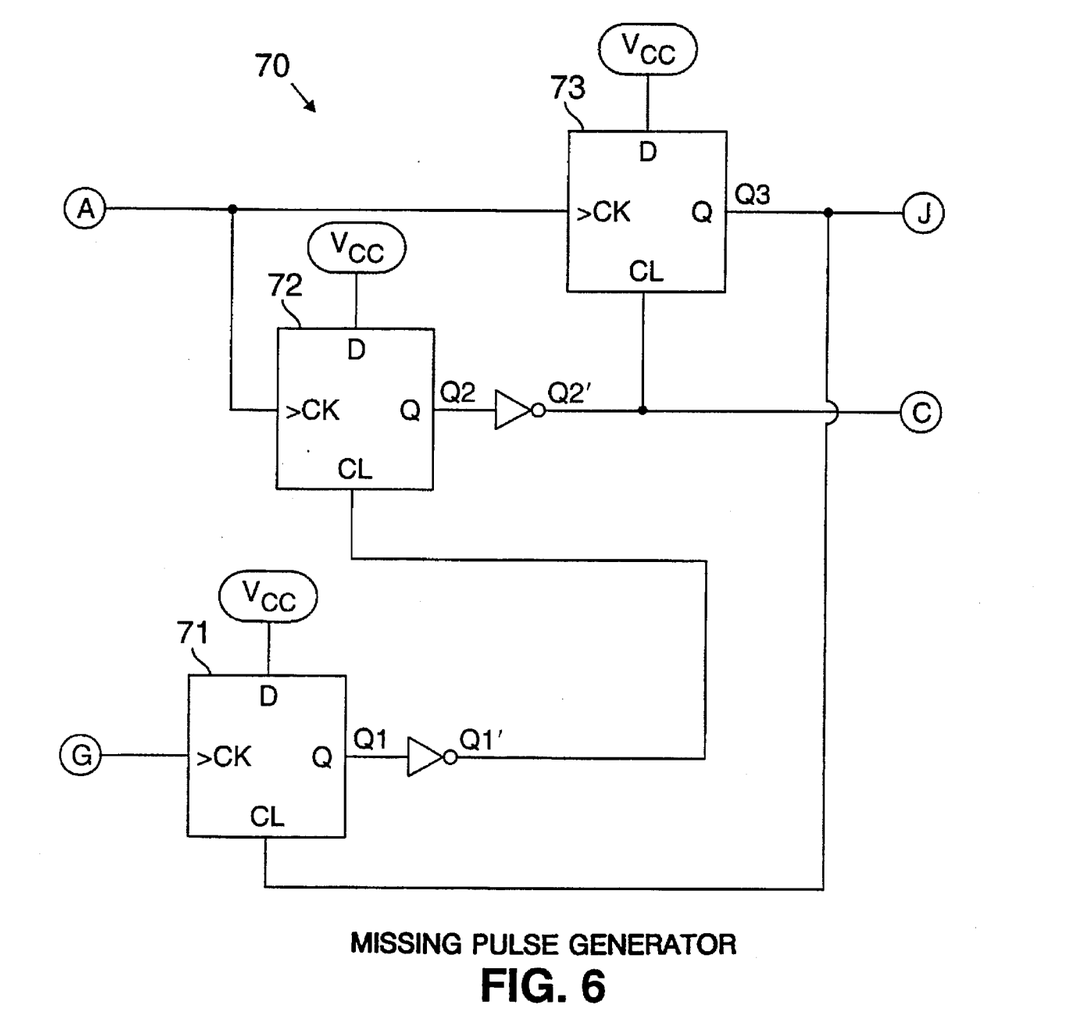
FIG. 6 is a schematic diagram of missing pulse generator circuitry.
Figure 7:
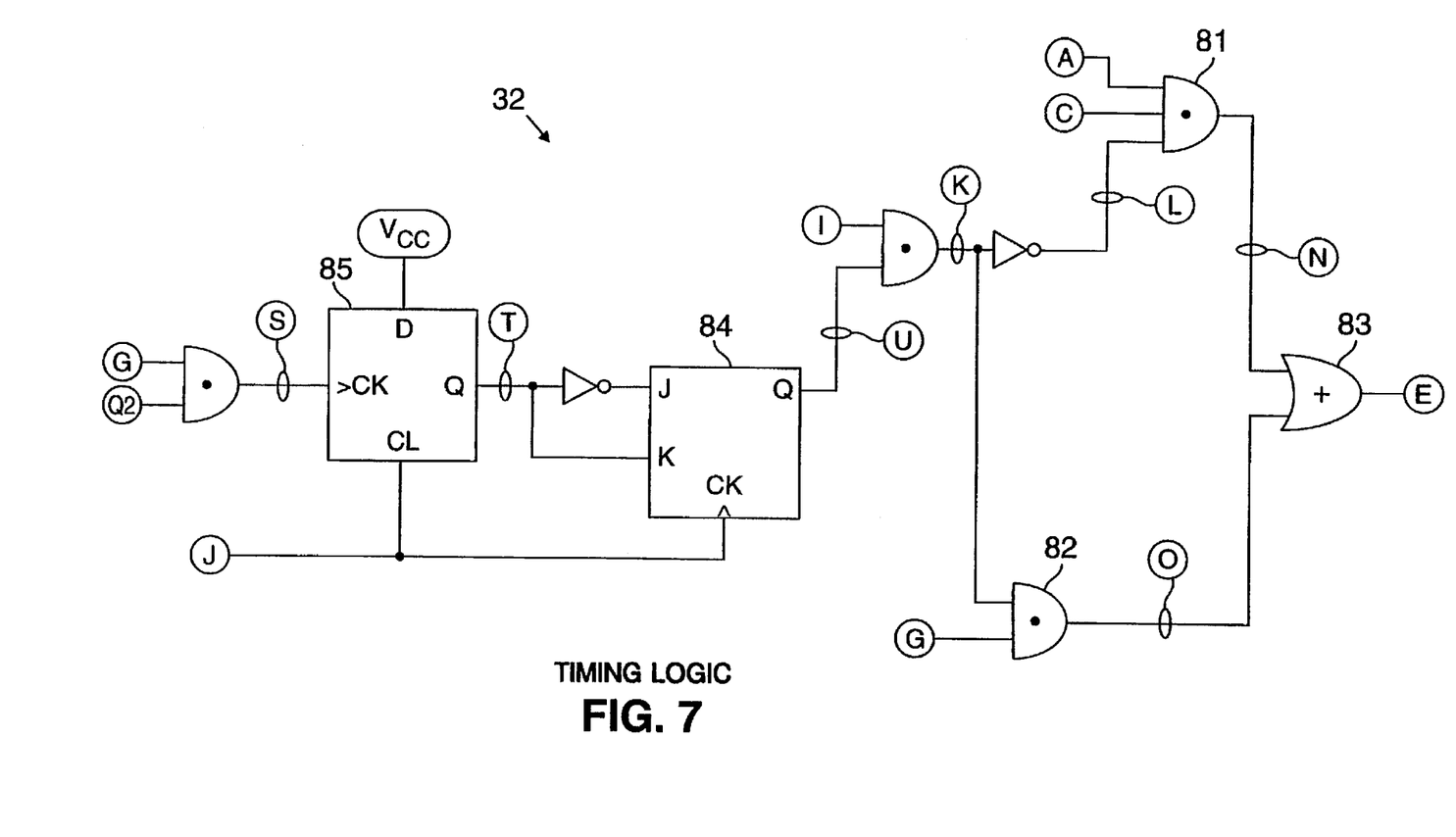
FIG. 7 is a schematic diagram of timing logic circuitry.
Figure 8:
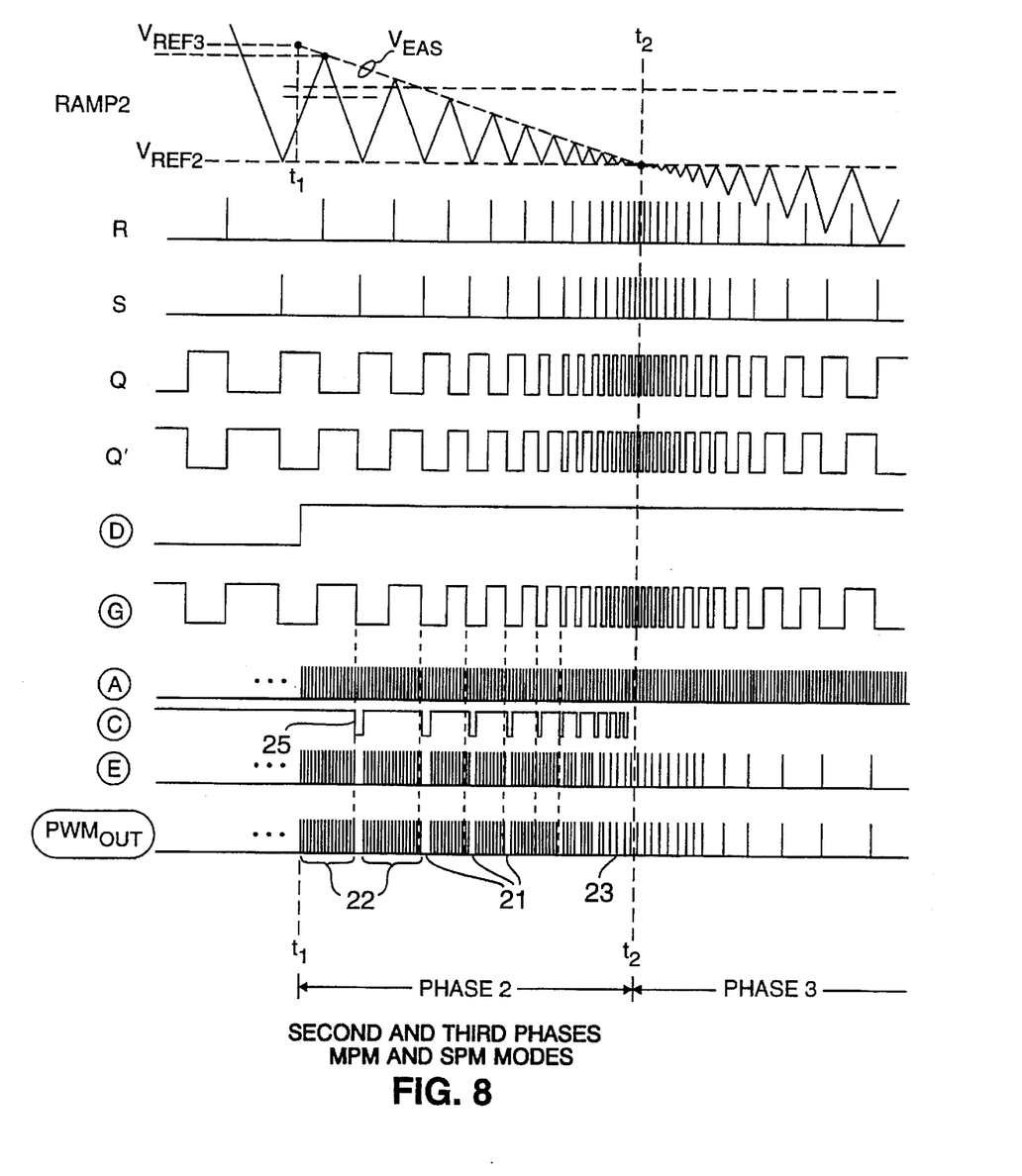
FIGS. 8 through 12 are timing diagrams.

When $V_{EAS}$ is less than $V_{REF2}$ (during the second and third phases), signal E output from clock logic 31 is affected by the circuit 60 of FIG. 5, called the "dual slide modulator" (DSM) and the circuit 70 of FIG. 6, called the "missing pulse generator" (MPG). During the second phase (when $V_{EAS}$ drops from $V_{REF3}$ to $V_{REF2}$), the DSM circuit 60 produces a pulse train G of variable frequency, the frequency being inversely proportional to the level of $V_{EAS}$ (FIG. 8). Each time G goes LOW, the MPG 70 produces a blanking pulse C received by timing logic 32 (FIG. 7). Signal E thus becomes, in the second phase, the oscillator signal A with a single pulse blanked at a frequency that increases as $V_{EAS}$ decreases until every other pulse is blanked just before time $t_2$. $PWM_{OUT}$ continues to be a pulse stream whose pulses are of the minimum pulse width 20. However, because fewer pulses are received at the clock input CK of flip-flop 30, there will be fewer of the minimum-pulse-width pulses at $PWM_{OUT}$.

Signal G, which determines the interval of the missing cycle pulses during phase two operation, is accomplished as follows: In the DSM circuit 60 of FIG. 5, while $V_{EAS}$ is greater than $V_{REF2}$, diode D1 will be forward biased and diode D2 reverse biased. The positive input of comparator C1 will then equal $V_{REF2}$, and the negative input of comparator C2 will equal $V_{EAS}$. A ramp signal RAMP2 is received at the negative input of comparator C1 and the positive input of comparator C2. The waveform of RAMP2 is shown in FIG. 8. When RAMP2 exceeds $V_{EAS}$ during phase two, the output of comparator C2 goes HIGH thus resetting RS flip-flop 66 (i.e., resetting flip-flop 66 output Q to LOW) which causes RAMP2 to begin discharge (ramp down). When RAMP2 falls below $V_{REF2}$, the output of comparator C1 goes HIGH, setting RS flip-flop 66 so that output Q is HIGH, which causes RAMP2 to ramp upward and the cycle repeats. The output Q of RS flip-flop 66 is thus a pulse train whose frequency increases and pulse width decreases as $V_{EAS}$ decreases. When Q is HIGH, capacitor C4 is charged from the Q output through resistor R1 and is said to "ramp up." When Q is LOW, capacitor C4 now discharges through resistor R1 and thus is said to "ramp down." Finally, signal D, which goes HIGH when $V_{EAS}$ drops below $V_{REF3}$, is AND'ed with the output of the RS flip-flop 66 (FIG. 5) such that there is an output at G only when $V_{EAS}$ is less than $V_{REF3}$. In other words, signal D enables output G during second and third phase operation.

Figure 9:
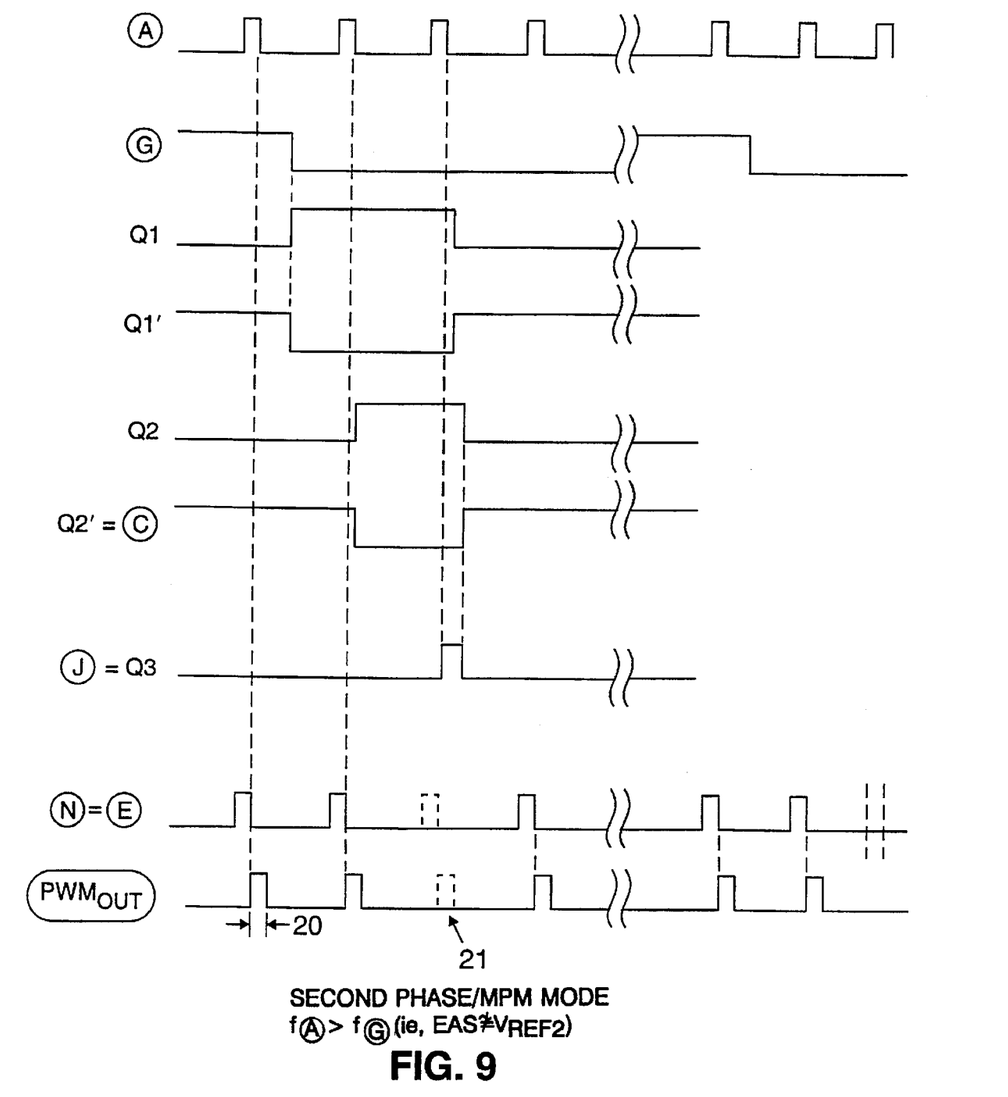
Figure 10:
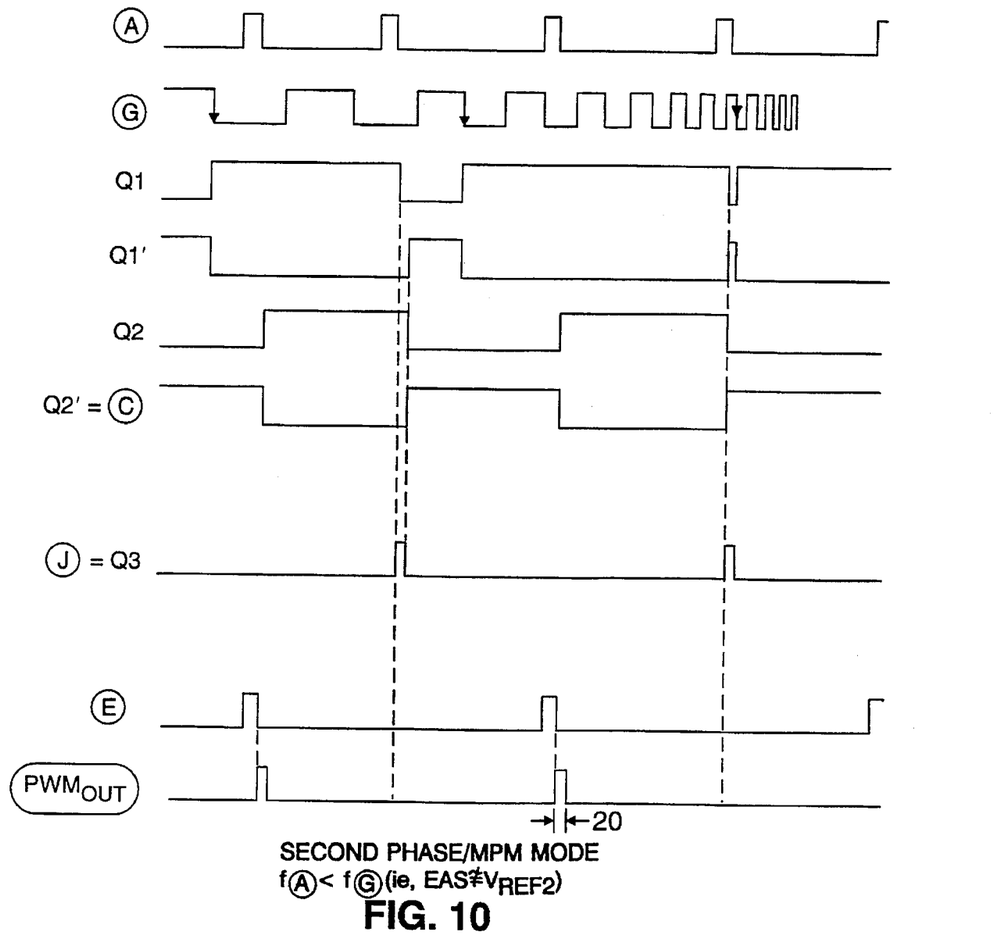

Signal G is received by the missing pulse generator (MPG) 70 (FIG. 6). As shown in FIGS. 9 and 10, for each time signal G goes LOW, signal C produced by MPG 70 goes LOW. A LOW C is used by timing logic 32 (FIG. 7), and specifically AND gate 81, to blank oscillator signal A during a single pulse of that signal so as to create a missing pulse stream at signal E and consequently $PWM_{OUT}$. In FIG. 6, signal G is received at the clock input CK of a first D-type flip-flop 71. Initially, the clear input CL, which is Q3, to flip-flop 71 is LOW. At the falling edge of a G pulse, flip-flop 71 output Q1 goes HIGH and Q1' LOW. A second D-type flip-flop 72 receives Q1' at its clear input CL and the oscillator signal A at its clock input CK. When Q1' goes LOW, flip-flop 72 output Q2 goes HIGH and Q2' LOW at the next falling edge of a pulse of oscillator signal A. At the clock input CK of flip-flop 73 the oscillator signal A is received. Thus, when Q2' (received at the clear input CL of flip-flop 73) is LOW, flip-flop 73 output Q3 goes HIGH at the trailing edge of the next oscillator pulse. Q3 going HIGH causes flip-flop 71 to clear, which causes flip-flop 72 to clear; flip-flops 71 and 72 being cleared causes flip-flop 73 to be cleared. Thus, MPG 70 produces an output signal C that is low during the time of the second oscillator pulse following G going LOW; otherwise output signal C is HIGH. Now referring to the timing logic circuit 32 (FIG. 7), by virtue of the fact that oscillator signal A and MPG output signal C are AND'ed (by AND gate 81), AND gate 81 output N is the oscillator pulse A with a single pulse blanked where MPG output C is LOW (FIG. 8). As seen later, signal L received by AND gate 81 will always be HIGH and signal 0 received by OR gate 83 will always be LOW during phase two operation. Output signal E thus equals N during phase two operation, and is received at the clock input CK of the D flip-flop (FIG. 3). The missing pulse stream thus created at $PWM_{OUT}$ during phase two operation is shown in the timing diagram of FIGS. 8, 9 and 10.

Early in phase two, when $V_{EAS}$ is only slightly below $V_{REF3}$, the frequency of the pulse train G may be, for example, approximately 500 Hz. Given that the oscillator signal A is at 50 kHz, and because one oscillator pulse is blanked per pulse of G, at this early period of phase two one pulse per 100 oscillator pulses will be blanked (FIG. 8, E and $PWM_{OUT}$). As $V_{EAS}$ continues to drop, the frequency of G increases which causes oscillator pulses to be blanked more frequently. When $V_{EAS}$ gets very near $V_{REF2}$, the frequency of G will surpass ½ the frequency of oscillator signal A. When this occurs, even though there may be many more G pulses than A pulses, the MPG circuit 70 (FIG. 6) will not allow more than every other signal to be blanked. The timing diagram of FIG. 10 shows that this is true because not every instance of G going LOW results in a pulse being blanked. Rather, flip-flop 71 being cleared (i.e., Q1 being HIGH) is necessary before G going LOW will initiate the blanking of an oscillator pulse. Thus, in the MPM mode, a single pulse of the oscillator pulse train A is blanked at an increasing frequency that is inversely proportional to the level of $V_{EAS}$ until every other oscillator pulse is blanked.

When $V_{EAS}$ drops below $V_{REF2}$, the third phase begins in which converter 10 operates in the single pulse modulator (SPM) mode. In this phase, as $V_{EAS}$ decreases, the time now begins to increase between successive pulses received by clock input CK (signal E) of D flip-flop 30 (FIG. 3), and thus also between successive pulses 23 output ($PWM_{OUT}$) from D flip-flop 30 (FIGS. 2A–D and 8).

If FIG. 5, when $V_{EAS}$ drops below $V_{REF2}$, diode D1 becomes reverse biased and diode D2 forward biased. Therefore, during the SPM mode, the positive input of comparator C1 will equal $V_{EAS}$, and the negative input of comparator C2 will equal $V_{REF2}$. Ramp signal RAMP2 thus continues to ramp up and down between $V_{REF2}$ and $V_{EAS}$ (FIG. 8) but the polarity is now reversed as $V_{EAS}$ is less than $V_{REF2}$. When RAMP2 exceeds $V_{REF2}$, the output of comparator C2 goes HIGH thus resetting RS flip-flop 62 (i.e., Q goes LOW) and, because a HIGH Q' is now fed back, RAMP2 ramps down. Then, when RAMP2 falls below $V_{EAS}$, the output of comparator C1 goes HIGH thus setting flip-flop 62 (i.e., Q goes HIGH) and causing RAMP2 to ramp up. The output Q and also G (note that D is still HIGH because $V_{EAS}$ is less than $V_{REF3}$), as can be seen from the phase three portion of FIG. 8, are thus pulse trains whose frequency decrease as $V_{EAS}$ decreases.

Figure 11:
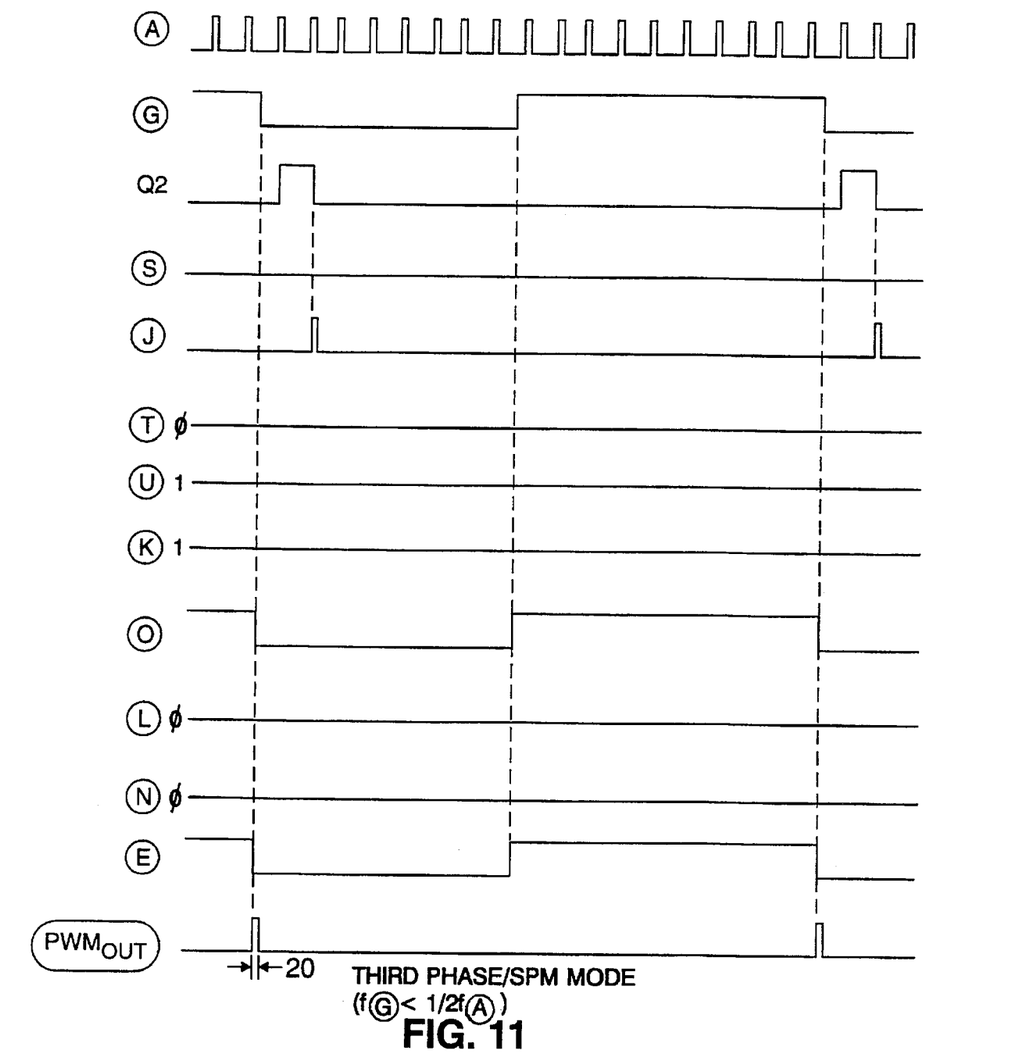

Operation of timing logic 32 of FIG. 7 in phase three differs depending upon whether the frequency of signal G is greater than ½ the oscillator frequency. In the early stages of phase three, the frequency of signal G will be greater than ½ the oscillator frequency. However, as $V_{EAS}$ continues to drop, the frequency of G will continue to decrease until it is less than ½ the oscillator frequency (FIG. 8). For operation when $V_{EAS}$ has fallen far enough below $V_{REF2}$ and the frequency of signal G is less than ½ the oscillator frequency, signal N will always be LOW, K always HIGH, thus making signal E equal signal G (FIG. 11). Signal K is always HIGH because the SPM enable signal I is HIGH when $V_{EAS}$ is less than $V_{REF2}$ (FIG. 5) and the output of JK flip-flop 84 (signal U) will always be HIGH. Signal U will always be HIGH for the following reason. First, signal J is a pulse that occurs upon the second oscillator pulse following the trailing edge of a G pulse. If the frequency of G is less than ½ the frequency of the oscillator frequency, signal G will still be low when Q2 is HIGH. Therefore, D flip-flop 85 will not receive a pulse at its clock input CK; rather, the signal S received at the clock input CK will always be LOW. Consequently, the output of D flip-flop 85 (signal T) will always be low thereby making the set (J) input to flip-flop 84 always HIGH as will be its output (signal U). Thus, as seen in the timing diagram of FIG. 11, the clock logic's output E will be a pulse train whose frequency is tied to the frequency of G which decreases as $V_{EAS}$ decreases. Thus, the time between pulses at $PWM_{OUT}$ increases, and at a given load the time interval between pulses is of essentially equal length.

Figure 2C:
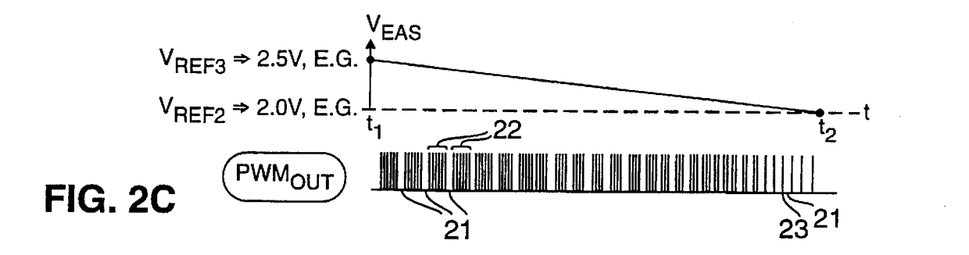
Figure 2D:
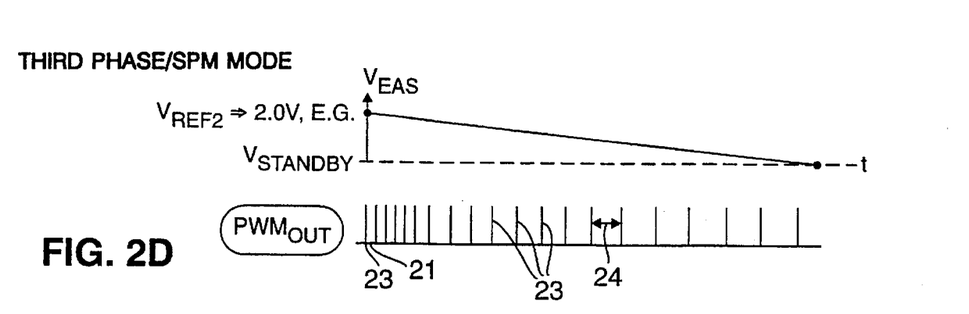
Figure 12:
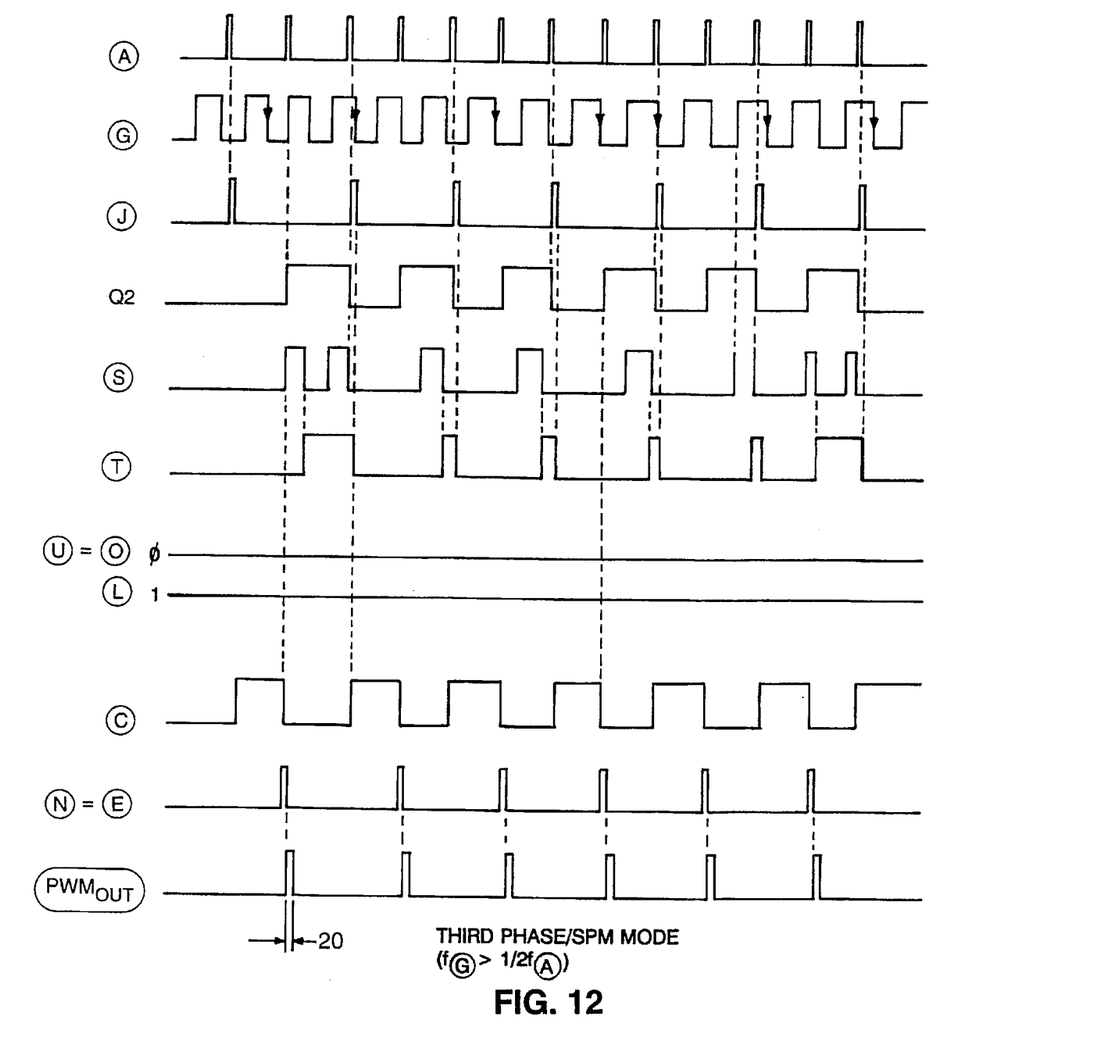

The purpose of JK flip-flop 84 and D flip-flop 85 in timing logic 32 (FIG. 7) is to ensure that during the initial stages of phase three, where the frequency of G is greater than ½ the frequency of oscillator signal A, the frequency of pulses E sent to flip-flop 30 of FIG. 3 does not exceed ½ the frequency of the oscillator. In other words, under this condition, output signal $PWM_{OUT}$ looks very much like it did at the latter stages of phase two (FIGS. 2B, 2C and 8). This ensures a smooth transition between the MPM mode and SPM mode. In FIG. 12, the output of JK flip-flop 84 (signal U) is always LOW, as opposed to being always HIGH When $V_{EAS}$ falls well below $V_{REF3}$. Because the frequency of G is greater than ½ the oscillator frequency, when Q2 goes HIGH, G is not always LOW; G will be HIGH during at least part of the time that Q2 is HIGH. Signal T output from flip-flop 85 will thus go HIGH when either signal G or Q2 goes LOW, and signal T will stay HIGH until signal J, received at the clear input CL, goes HIGH. Consequently, signal J input to JK flip-flop 84 will be LOW when signal J is received at the clock input CK of flip-flop 84, and its output (signal U) will always be LOW. Signal U being low thus causes signal G to be blanked and not seen at output signal E, and also signals C and A AND'ed to not be blanked and seen at output signal E. Thus, in the SPM mode when $f_G > \frac{1}{2} f_A$, output signal E, and consequently $PWM_{OUT}$, is the same as during the MPM mode when $f_G > \frac{1}{2} f_A$. At these times, a minimum width pulse is generated at $PWM_{OUT}$ for every other oscillator pulse.

Other embodiments are within the scope of the claims.

What is claimed is:

1. A method of controlling, in a switching converter that is controlled by switch control pulses and that delivers power to a load, a transition between higher load and lower load modes, comprising:

in a first operating phase when the load is above a first threshold, varying the output power by varying the width of the switch control pulses, and in a second operating phase when the load is below the first threshold, modulating periodic blanking pulses wherein each blanking pulse blanks a single switch control pulse and the frequency of the periodic blanking pulses increases to decrease output power.

2. The method of claim 1 wherein, in the second operating phase, a single switch control pulse is periodically blanked with increased frequency until every other switch control pulse is blanked when the load has fallen to a second threshold.

3. The method of claim 2 further comprising, in a third operating phase when the load is below the second threshold, modulating periodic enabling pulses wherein each enabling pulse enables a single switch control pulse and the frequency of the periodic enabling pulses decreases to decrease output power.

4. The method of claim 3 wherein, in the third operating phase, the single switch control pulses are enabled at a frequency that is no greater than half the frequency of switch control pulses in the first operating phase.

5. A method of controlling, in a switching converter that is controlled by switch control pulses and that delivers power to a load, a transition between higher load and lower load modes, comprising:

in a first operating phase, prior to the load falling to a first threshold, regulating the output of the converter by regulating the width of constant frequency switch control pulses, in a second operating phase, after the load falls below the first threshold, regulating the output of the converter by periodically blanking an individual switch control pulse at a varying rate, and in a third operating phase, after the load falls below a second threshold, regulating the output of the converter by varying the intervals between the leading edges of said pulses.

6. A method of controlling the switching operation of a converter that is controlled by switch control pulses and that delivers power to a load, comprising:

in a higher load mode, varying the widths of switch control pulses to accommodate variations in the load, and in a lower load mode, modulating periodic enabling pulses wherein each enabling pulse enables a single switch control pulse and the frequency of the enabling pulses decreases to decrease output power.

7. Apparatus for controlling, in a switching converter that is controlled by switch control pulses and that delivers power to a load, a transition from higher load to lower load modes, comprising:

a pulse width modulator for regulating the output power in a first operating phase; and pulse blanking circuitry for periodically blanking single ones of said switch control pulses in a second operating phase, the switch control pulses being blanked with increased frequency to decrease output power.

8. The apparatus of claim 7 further comprising, pulse spreading circuitry for increasing the intervals between the leading edges of successive pulses during a third operating phase.

9. The apparatus of claim 8 wherein the first operating phase corresponds to loads above a first threshold, the second operating phase corresponds to loads below the first threshold and above a second threshold, and the third operating phase corresponds to loads below the second threshold.

10. The apparatus of claim 9 wherein the pulse width modulator produces pulses having a minimum pulse width for loads below the first threshold.

11. The apparatus of claim 10 wherein, in the second operating phase and as the load drops toward the second threshold, the blanking of individual minimum-pulse-width pulses by the pulse blanking circuitry increases in frequency until reaching a frequency wherein every other pulse is blanked.

12. The apparatus of claim 11 wherein the pulse spreading circuitry comprises blanking circuitry that produces, during the third operating phase, a blanking pulse that blanks pulses of the minimum-pulse width pulse train.

13. The apparatus of claim 12 wherein, in the third operating phase and as the load drops from the second threshold, the blanking of minimum-pulse-width pulses by the pulse spreading circuitry's blanking circuitry increases in duration such that, at the higher-load end of the third operating phase, every other pulse is blanked, and, as the load drops, an increasing number of consecutive pulses is blanked between a single passed pulse.

* * * * *